United States Patent
Gotwalt et al.

(10) Patent No.: US 9,489,313 B2
(45) Date of Patent: Nov. 8, 2016

(54) CONDITIONAL PAGE FAULT CONTROL FOR PAGE RESIDENCY

(71) Applicant: QUALCOMM Incorporated, San Diego, CA (US)

(72) Inventors: David A. Gotwalt, Winter Springs, FL (US); Thomas Edwin Frisinger, Shrewsbury, MA (US); Andrew Evan Gruber, Arlington, MA (US); Eric Demers, San Diego, CA (US); Colin Christopher Sharp, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/035,643

(22) Filed: Sep. 24, 2013

(65) Prior Publication Data

US 2015/0089146 A1  Mar. 26, 2015

(51) Int. Cl.
*G06F 12/00* (2006.01)
*G06F 12/10* (2016.01)
*G06F 12/08* (2016.01)
*G06T 1/60* (2006.01)

(52) U.S. Cl.
CPC .......... *G06F 12/1009* (2013.01); *G06F 12/08* (2013.01); *G06T 1/60* (2013.01); *G06F 2212/302* (2013.01)

(58) Field of Classification Search
CPC ................ G06F 12/1009; G06F 9/44; G06F 2212/302; G06T 1/60; G06T 11/001
See application file for complete search history.

(56) References Cited

U.S. PATENT DOCUMENTS

| | | | |
|---|---|---|---|
| 6,650,333 B1 | 11/2003 | Baldwin | |
| 7,710,424 B1 | 5/2010 | Hutchins | |
| 2007/0055843 A1 | 3/2007 | Lameter | |
| 2007/0073996 A1* | 3/2007 | Kruger et al. | 711/207 |
| 2008/0106552 A1 | 5/2008 | Everitt | |
| 2010/0321397 A1 | 12/2010 | Ginzburg | |
| 2011/0157205 A1* | 6/2011 | Tao et al. | 345/582 |
| 2011/0161620 A1 | 6/2011 | Kaminski et al. | |

OTHER PUBLICATIONS

Zink et al., "Practical Rendering & Computation with Direct3D 11," Overview of Direct 3D, CRC Press, Nov. 2, 2011, pp. 4-7.
"Graphics Pipeline," Windows, Dev Center—Desktop, retrieved from http://web.archive.org/web/20130717081357/ http://msdn.microsoft.com/en-us/library/windows/desktop/ff476882(v=vs.85).aspx, Jul. 17, 2013, 3 pp.

(Continued)

*Primary Examiner* — David X Yi
*Assistant Examiner* — Alan Otto
(74) *Attorney, Agent, or Firm* — Shumaker & Sieffert, P.A.

(57) ABSTRACT

The present disclosure provides for systems and methods to process a non-resident page that may include attempting to access the non-resident page, an address for the non-resident page pointing to a memory page containing default values, determining that the non-resident page should not cause a page fault based on an indicator indicating that a particular non-resident page should not generate a page fault, returning an indication that a memory read did not translate and returning the default value when the access of the non-resident page is a read and the non-resident page should not cause a page fault. Another example may discontinue a write when the access of the non-resident page is a write and the non-resident page should not cause a page fault.

31 Claims, 6 Drawing Sheets

(56) References Cited

OTHER PUBLICATIONS

International Search Report and Written Opinion from International Application No. PCT/US2014/053016, dated Nov. 6, 2014, 11 pp.

Second written opinion from International Application No. PCT/US2014/053016, dated Sep. 10, 2015, 4 pps.

International Preliminary Report on Patentability from International Application No. PCT/US2014/053016, dated Jan. 20, 2016, 8 pp.

* cited by examiner

CONDITIONAL PAGE FAULT CONTROL FOR PAGE RESIDENCY

TECHNICAL FIELD

This disclosure relates to resident and non-resident pages in a graphics memory and more particularly to techniques for page fault control.

BACKGROUND

Generally, accesses to non-resident pages in some systems cause a page fault. A non-resident page is a page that does not have a physical memory location associated with it. Conversely, a resident page is a page that has a physical memory location associated with it. For example, a non-resident page may have a virtual address, but no actual physical memory associated with that address. In some examples, software may map the virtual address to the physical address for resident pages using, for example, a page table. Generally, no mapping can occur for non-resident pages because a non-resident page has no physical memory allocated to it. A memory management unit (MMU) may perform a look up to determine the mapping between virtual addresses and physical addresses in order to perform a memory transaction such as a memory read or a memory write.

SUMMARY

Some application programming interfaces (APIs) for handling tasks related to, e.g., multimedia, may allow non-resident pages to be accessed without a fault. The present disclosure provides for systems and method related to techniques for distinguishing between non-resident pages that cause a fault and do not cause a fault. In one example, when a non-resident tile is accessed predetermined bit values may be returned in response to a read instruction and in response to a write instruction to a non-resident tile, the write may be dropped. In another example, a "dummy page" filled will the proper default values can be used for all non-resident pages. The dummy page may be a single memory page filled with the proper default values that may be accessed when any memory addresses to a non-resident page are read, for example. In some examples, an indication, such as a signal, that a memory read did not translate may also be returned. A memory read does not translate when the virtual address does not map to a physical address. In other words, a memory address does not translate when the page the virtual address points to a page that is non-resident. When a page is non-resident, the virtual address cannot be translated into a physical address because no physical address exists for the virtual address.

A non-resident page is a page for which there is not a physical memory location and hence no mapping of virtual address to physical address. A resident page, conversely, is a page that have a physical memory location and hence may be a mapping of virtual address to physical address. Additionally, this disclosure describes various ways to let a client, i.e., a device that may attempt to read or write to the pages in a memory, know when a page is non-resident.

In one example, the disclosure describes a method of processing a non-resident page including attempting to access the non-resident page, an address for the non-resident page pointing to a memory page containing default values, determining that the non-resident page should not cause a page fault based on checking an indicator that indicates that the non-resident page should not generate a page fault, and returning an indication that a memory read did not translate and returning the default values when the access of the non-resident page is a read and the non-resident page should not cause a page fault.

In one example, the disclosure describes a method of processing a non-resident page including attempting to access the non-resident page, an address for the non-resident page pointing to a memory page containing default values, returning an indication that a memory read did not translate and returning the default values when the access of the non-resident page is a read and the non-resident page should not cause a page fault, and discontinuing a write when the access of the non-resident page is a write and the non-resident page should not cause a page fault.

In another example, the disclosure describes an apparatus for processing a non-resident including a processor configured to attempt to access the non-resident page, an address for the non-resident page pointing to a memory page containing default values, determine that the non-resident page should not cause a page fault based on checking an indicator that indicates that the non-resident page should not generate a page fault, and return an indication that a memory read did not translate and return the default values when the access of the non-resident page is a read and the non-resident page should not cause a page fault.

In another example, the disclosure describes an apparatus for processing a non-resident including a processor configured to attempt to access the non-resident page, an address for the non-resident page pointing to a memory page containing default values, return an indication that a memory read did not translate and return the default values when the access of the non-resident page is a read and the non-resident page should not cause a page fault, and discontinue a write when the access of the non-resident page is a write and the non-resident page should not cause a page fault.

In another example, the disclosure describes an apparatus for processing a non-resident including means for attempting to access the non-resident page, an address for the non-resident page pointing to a memory page containing default values, means for determining that the non-resident page should not cause a page fault based on the means checking an indicator that indicates that the non-resident page should not generate a page fault, and means for returning a default value when the access of the non-resident page is a read and the non-resident page should not cause a page fault.

In another example, the disclosure describes an apparatus for informing a client that a page is non-resident including means for accessing a non-resident page, an address for the non-resident page pointing to a memory page containing default values, means for returning an indication that a memory read did not translate and means for returning the default values when the access of the non-resident page is a read and the non-resident page should not cause a page fault, and means for discontinuing a write when the access of the non-resident page is a write and the non-resident page should not cause a page fault.

In another example, the disclosure describes a computer-readable storage medium. The computer-readable storage medium having stored thereon instructions that upon execution cause one or more processors attempt to access a non-resident page, an address for the non-resident page pointing to a memory page containing default values, determine that the non-resident page should not cause a page fault based on checking an indicator that indicates that the non-resident page should not generate a page fault, and return an indication that a memory read did not translate and return the default value when the access of the non-resident page is a read and the non-resident page should not cause a page fault.

In another example, the disclosure describes a computer-readable storage medium. The computer-readable storage medium having stored thereon instructions that upon execution cause one or more processors a non-transitory computer readable storage medium storing instructions that upon execution by one or more processors cause the one or more processors to attempt to access a non-resident page, an address for the non-resident page pointing to a memory page containing default values return an indication that a memory read did not translate and returning the default values when the access of the non-resident page is a read and the non-resident page should not cause a page fault, and discontinue a write when the access of the non-resident page is a write and the non-resident page should not cause a page fault.

The details of one or more examples are set forth in the accompanying drawings and the description below. Other features, objects, and advantages will be apparent from the description and drawings, and from the claims.

DETAILED DESCRIPTION

Figure 1:
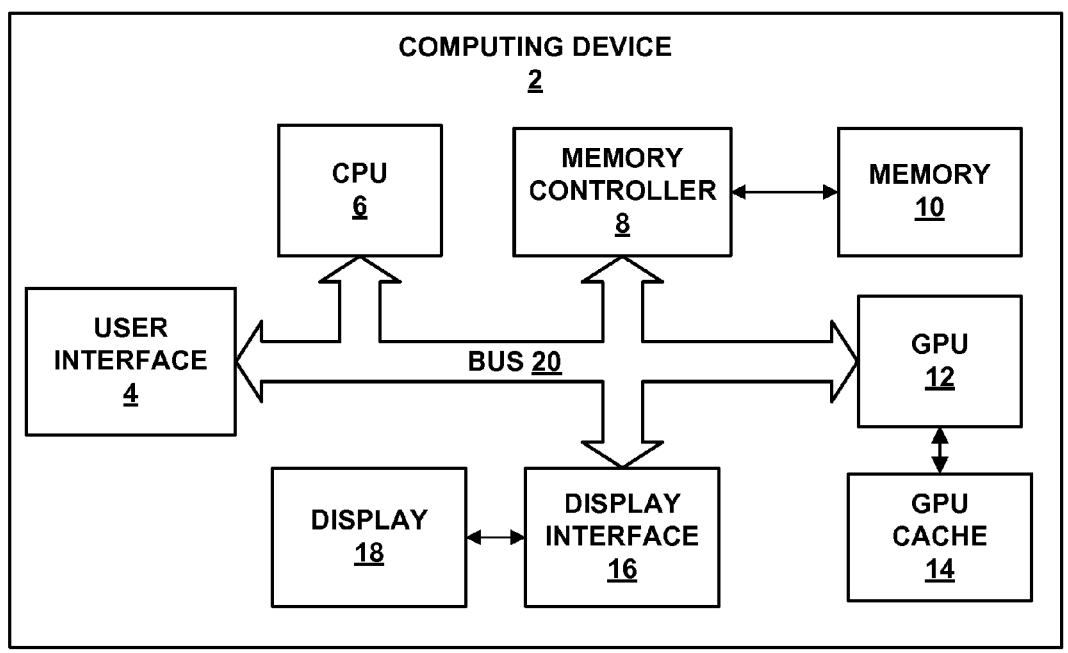
FIG. 1 is a block diagram illustrating an example computing device that may be used to implement the techniques described in this disclosure.

As discussed above, some APIs allow non-resident pages to be accessed without a fault. One example is a new feature in DirectX 11 (DX11) called tiled resources. Tiled resources allow for non-resident pages of a resource to be accessed via a graphics operation (e.g., texture read, color buffer write) without faulting.

This disclosure relates to techniques for page fault control. The present disclosure provides for systems and method related to techniques for distinguishing between non-resident pages that cause a fault and do not cause a fault. For example, this disclosure describes various techniques to distinguish between non-resident pages that cause a fault and non-resident pages that do not cause a fault. A page fault generally occurs when a processor or memory management unit attempts to read or write to a memory address of a non-resident page. As described above, a non-resident page is a page for which there is not a physical memory location and hence no mapping of virtual address to physical address. Resident pages, conversely, are pages that have a physical memory location and hence may be a mapping of virtual address to physical address.

Additionally, this disclosure describes various ways to let a client know when a page is a non-resident page. For example, the techniques described in this disclosure may allow the client to determine that it is accessing a non-resident page. In some of the techniques described in this disclosure, rather than halting the execution of the subsequent commands, the client may be configured to handle such accesses to non-resident pages. A client is device that may attempt to read or write to the pages in a memory. In some examples, a processor may be a client. For example, a graphics processing unit may be a client. In such an example, multiple sub-clients within the GPU may request access (e.g., a texture sub-client may request a read from an address while a raster unit could request a write). In such an example, the GPU is making read & write requests. In some examples, a client may be a requester within the GPU, such as a texture unit, blender unit, or shader unit. The memory management unit (MMU) may be a client. The MMU is generally a slave to one or more of the above clients, however. In one example, when a non-resident tile is accessed by a client predetermined bit values may be returned in response to a read operation and in response to a write operation may be dropped. In another example, a "dummy page" filled will the proper default values may be used for all non-resident pages. The dummy page may be a single memory page filled with the proper default values. When a client accesses any memory addresses to a non-resident page the values in the dummy page may be returned to the client.

As discussed above, a new feature in DX11 called tiled resources allows for non-resident pages of a resource to be accessed via a graphics operation (i.e. texture read, color buffer write) without faulting. Accordingly, it may be necessary to distinguish between non-resident pages that cause a fault and non-resident pages that do not cause a fault. Additionally, a way should be found to let a client know when a page is non-resident.

In one example, DX11 page attributes such as Read Permission (R), Write Permission (W), Cacheable memory location (C), and Shared memory location (S) may include an additional bit, flag, or other indication to specify that an access to a non-resident page should not generate a page fault. Some examples of the systems and methods described herein may add the NF (no faulting) bit on top of existing ARM bits. The above list of other bits is not intended to be exhaustive with respect to other attributes. There may be others. The page attributes R, W, C, and S are only given as examples, based on ARM.

In some examples, the no fault (NF) bit (flag, etc.) may indicate that an access to this non-resident page should not generate a page fault. For example, for a given virtual address, the page table may store the physical address that is associated with the virtual address, as well as page attributes of the data stored in the page identified by the physical address. The page attributes may be stored as binary bits in a page table. The page table may be mapped to a physical address (as one example). NF bit 208 may be add to page attributes to specify an access to this non-resident page should not generate a page fault. An example device implementing these systems and methods may then return a default value for reads or drop the write. Thus, NF bit 208 may indicate that an access to non-resident material should not cause a fault. In one example, such a device may determine if a fault should occur or not for a read or write. If a fault does not occur the read or write may be translated. If a fault does occur then the device may use NF bit 208 to determine if the fault should be reported the fault to the operating system (OS) about the fault. The device may perform various typical page fault correction. Alternatively, if NF bit 208 indicates that a fault should not be reported to the OS, the device may return a value such as 0x0 for reads or the device may abort the writes and continue.

As discussed above, in some examples, an indication, such as a single, that a memory read did not translate may also be returned. A memory read does not translate when the virtual address does not map to a physical address. In other words, a memory address does not translate when the page the virtual address points to a page that is non-resident. When a page is non-resident, the virtual address cannot be translated into a physical address because no physical address exists for the virtual address.

While one purpose of NF bit 208 may be to specify that non-resident material should not cause a fault, NF bit 208 may also affect the determination of a non-resident page. For example, NF bit 208 may be used to determine if the page in a tiled resource is resident as described here. In various examples described herein, NF bit 208 may be used in conjunction with default values, residency checks, etc. to determine if a page in a tiled resource is resident.

In an example, if a fault occurs, then a memory access to a non-resident page has occurred and NF bit 208 must have been set to allow faults. If a fault does not occur, a memory access has occurred, and NF bit 208 is such that a fault is allowed to occur, then the attempted memory access must be to a resident page. If a fault would have occurred, except NF bit 208 was set so that a fault will not occur, then other aspects of the disclosure may occur, such as returning of default values, residency checks, etc.

Some examples may use existing page table attributes. In other words, there may not need to be a NF bit 208 in such an example. In such an example, a "dummy page" filled will the proper default values can be used for all non-resident pages. The dummy page may be a single memory page filled with the proper default values that may be accessed when any memory addresses to a non-resident page are read, for example. Such an example may store a dummy page at a particular physical memory address and store the value of the physical memory address in a register. The virtual addresses of the non-resident pages may be mapped to the physical memory address of the dummy page. Additionally, when a page is being accessed, its physical memory in the page table may be compared to the physical memory value stored in the register. If the two values are the same, then the client determines that it is accessing a non-resident page. If the two values are different, then the client determines that it is accessing a resident page.

Some examples provide for letting a client, e.g., a device that may access memory, such as a processor, know when a page is non-resident. This is referred to as a residency check. A residency check may be used because, while default or dummy values may provide an indication that a page is non-resident, it is always possible that a resident page may happen to have these values stored in memory, for example as actual data. In one example, a memory management unit (MMU) may return a bit, flag, or other indication that may indicate that the page is non-resident. This bit, flag, or other indication may be separate from NF bit 208 or flag. NF bit 208 is not necessarily the same as the bit returned to the client. In one example, a client, e.g., GPU, may read a bit from an MMU to determine if the page in a tiled resource is resident. Tiled resources are also known as megatextures, virtual textures, sparse textures, and partially resident textures. The tiles may be multiple memory pages that store different granularities of the same basic texture. This functionality provides for textures to be partially loaded in memory for quicker access, e.g., a texture, may be tiled or stored on multiple memory pages. This may allow larger textures to be used more efficiently. In other examples, a flag or other indictor may be read by the client.

In some examples, an advantage to this technique to distinguish between non-resident pages that cause a fault and non-resident pages that do not cause a fault is that the graphics processing system may allow for non-resident pages that should not cause a fault while still faulting when an access to a non-resident page that should cause a fault is attempted.

Accordingly, the DX11 tiled resources feature, which allows for non-resident pages of a resource to be accessed via a graphics operation (i.e. texture read, color buffer write) without faulting may be supported while still supporting page faults for accesses to all other resources (e.g., non-tiled resources) such that these other resources cause a page fault if an access is attempted and the page being accessed is a non-resident page. When an attempt is made to access a non-resident page to a non-tiled resource there is not need to map the virtual address of all non-resident pages in the non-tiled resource to a dummy page, rather, a fault will occur instead. Accordingly, graphics processing systems may return a page fault for non-resident pages that cause a fault. Generally, any memory operation, e.g., memory ready or memory write, to a non-resident page would return a page fault. However, tiled resources in DX11 is an example of a feature that allows for non-resident pages of a resource to be accessed via a graphics operation (i.e. texture read, color buffer write) without faulting. For non-resident. Other possible examples may include the "partially resident texture" extension in OpenGL.

A memory page containing default value may also be referred to as a dummy page and be said to contain dummy values. For example, in some cases, for accesses to all other resources, e.g., non-tiled, NF bit 208 may be set to allow a fault. In other words, a read or write to a non-resident page should cause a page fault for accesses to all other resources. Thus, for resources unrelated to DX11 tiled resources, which allows for non-resident pages of a resource to be accessed via a graphics operation (i.e. texture read, color buffer write) without faulting, NF bit 208 may be set to allow a fault. In one example, if NF is single bit and NF="1" indicates that no fault should occur, then NF="0" indicates that faults should be processed normally. In other words, any memory operation, e.g., memory ready or memory write, to a non-resident page would return a page fault because with non-resident pages there is no actual memory for the GPU or MMU to read or write. Accordingly, for accesses to all other resources, e.g., non-tiled, NF bit 208 would be "0." The converse is also true. Thus, if NF is single bit and NF="0," e.g., active low, indicates that no fault should occur, then NF="1" indicates that faults should be processed like normal. Accordingly, for accesses to all other resources, e.g., non-tiled, NF bit 208 would be "1." Similarly, flags and other indications may also allow for a graphics processing system, e.g., GPU, MMU, memory, etc., to support page faults for accesses to all non-tiled resources by simply returning a page fault rather than mapping a virtual address of the non-tiled non-resident page to a dummy page since generally a page fault occurs when a processor or memory management unit attempts to read or write to a memory address of a non-resident page. For example, one flag setting may indicate no fault while another allows for a fault to occur.

In an example, when a graphics processor, memory management unit (MMU) or other processor reads a non-resident page that should not cause a fault, default values, e.g., predetermined bit values such as all 0's, all 1's, etc. may be returned by the read. The default value provides a predefine value that may be used for all non-resident page accesses. In one example, if a read occurs to a non-resident page the value will be 0. This does not conclusively indicate that the page is non-resident, however. The default value, e.g., 0 may be a common value and it may be possible for resident pages to contain the default value by chance. An MMU or other processor may use a status or acknowledgement (ACK), for example, to indicate to a device, such as a GPU that may perform the read or may have requested that the MMU perform the read, that a non-resident page has been accessed. The ACK may provide an indication that a memory read did not translate. As discussed above, memory read does not translate when the virtual address does not map to a physical address. Some examples may use the ACK (or another indication or signal) to determine if a memory read translated. NF bit 208 or the default valued may provide an indication that the memory read should not cause a fault when it has been accessed. In another example, a texture unit, which may perform reads but generally does not perform writes, may receive the default value when it or another processor reads a non-resident page that should not cause a fault. Additionally, in an example, the client, e.g., GPU, may perform a residency check by requesting residency information from the MMU. For example, the GPU may send a signal to the MMU for to cause the MMU to provide an indication that a page is resident. For example, the GPU may provide an address as a signal to translate and the MMU performs a check for residency. The MMU may return an acknowledgement indicating if the page is a resident or non-resident page. The MMU manages the memory, accordingly, information related to pages that are resident and non-resident may be stored in the MMU or in a page table that may be internal or external to the MMU. In some examples, the page table may be stored in a portion of the memory, e.g., DRAM.

In an example, when the GPU attempts to write to a non-resident page, that write attempt should be dropped because the non-resident page does not map to a physical location and so there would be nowhere to write the data. The data for the attempted write may be lost and a processor or other circuitry may need to recalculate the data if it is later needed. This is generally necessary, however, because no memory location has been allocated to store the information for a non-resident page. As described in more detail, in an example, an MMU may drop the writes, for example, when the MMU determines that a write is to a non-resident page. As also described in more detail, in some examples, a pixel shader, geometry shader, or other shader unit of a graphics processing unit may perform a write and may be programmed to drop writes to non-resident pages.

As discussed above, a new feature in DX11 called tiled resources allows for non-resident pages of a resource to be accessed via a graphics operation (i.e. texture read, color buffer write) without faulting. Accordingly, it may be necessary to distinguish between non-resident pages that cause a fault and non-resident pages that do not cause a fault. Additionally, in some examples, a processor, graphics processor, or MMU may perform reads and/or writes for depth testing. Depth testing is a graphics operation that may be used to with respect to image depth coordinates in three-dimensional (3-D) graphics to decide which elements of a rendered scene are visible, and which are hidden. The processor, graphics processor, or MMU may also perform reads as part of color blending graphics operation. These functions may use the examples provided herein to allow for dealing with resident and non-resident pages related to depth testing, color blending, etc. An example color blending operation may read a previous color ("old_color") for blending with an incoming color ("incoming_color") to form a new color ("New_color). In other words, a color that was previously displayed on, e.g., a video display, may be blended with an incoming color to form a new color. The new color may be the color that is actually displayed. The previous color may be read by a processor performing the blending and blended using the following:

$$\text{New\_color}=\text{old\_color}*(1-\text{blend\_value})+\text{incoming\_color}*(\text{blend\_value})$$

In another example, a dummy page contains dummy values that indicate if a page is resident. The dummy page may be a single memory location or series of memory locations that form a page of information that may be mapped to any read to a non-resident page. For example, a system (such as a compare unit) may compare an address, e.g., a physical address in the page table with an address value for the dummy page stored in a register to determine if the physical address is the same as the address to the dummy page stored in the register. In this way, the system may determine if the page is resident. In some examples, the input address may be a virtual address stored in page tables. Status bits may also be stored in the page tables. The virtual address and the status bits may be combined to generate a physical address to which a given virtual address will map. For example, an MMU may be configured to map virtual addresses into physical addresses. The MMU may include a set of page table entries used to map a virtual address to a physical address of a tile. In some examples the MMU may include a cache line index that may be used to determine whether or not a request for a cache line is a hit or miss. The dummy page referred to has a physical address and the same physical address may be used for multiple virtual addresses. In this example, the dummy page physical address may be used for all virtual address table entries that are not present and part of PRT.

If the page being accessed matches the value in the register then the page is non-resident. Reads to the page may proceed as normal. This is because a processor or graphics processor will write the appropriate default value to the dummy page and these values will be read by a system attempting to access a non-resident page. An attempted write should be dropped. Again, the data for the attempted write may be lost and may need to be recalculated if the data is later needed. This is generally necessary, however, because no memory location has been allocated to store the information for a non-resident page other than the page that includes the dummy values that may be used by multiple non-resident pages. Additionally, in an example, a residency check should return false when the page being accessed matches the value in the register that indicate that the page is a non-resident page.

An advantage to some examples of this solution is that non-resident pages are transparently mapped to the 'dummy page' instead of creating a page fault on reads and that 'special' handling is needed only on writes. Another advantage to some examples of this solution is the default value may be programmable since software may be responsible for filling the page with the default value.

In some examples, the DX11 feature may also require a way for a graphics shader program to determine if a tiled-resource is resident or non-resident. A dummy page filled with the proper default values may be used for all non-resident pages. The default values stored in the dummy page may give an indication that a page is non-resident. Such values may be stored in a page simply because the data stored happens to be the same values as the default values, however. Additionally, in some cases, if a write occurs to any of these non-resident pages, however, it will overwrite the default value. Accordingly, the dummy page cannot be relied on to always return the correct default value, for example if the write is allowed to continue. Accordingly, another indication, such as a single, that a memory read did not translate may also be used in conjunction with the dummy values, as described herein. Additionally, in another example, a separate residency map may be used to allow a shader program to determine if a page is resident. Such an example may check the residency map to determine if a read from that texture may occur. For example, a GPU running a shader program may request a residency check from an MMU. When the GPU requests a residency check the MMU may check a residency may to determine if, for example, a tile (multiple memory pages) is resident in memory. If the check of the residency map returns that the tile is non-resident then a default value in the shader might be used rather than fetching the value from the memory. In one example, the requested memory access may to access a tiled texture. The tiled texture or one coarseness level of the tiled texture may not be stored in the memory. Accordingly, a default value may be returned instead or, as discussed in more detail below, a more coarse version of the texture may be available.

In various examples, techniques for distinguishing between non-resident pages that cause a fault and non-resident pages that do not cause a fault are provided. Additionally, various ways to let a client know when a page is non-resident are provided. What a client does when a page that is non-resident is being accessed may vary and may be generally dictated by the needs of the client.

For example, in one case a partially-resident texture may be used. A partially resident texture that is partially stored in memory. For example, some, but not all of the granularity levels of the texture might be stored in memory. Granularity refers to the level of detail for the texture that may be provided for a particular rendering. Generally, the farther away a given texture is supposed to be in a 2D rendering of a 3D picture the less detail that may be used in a texture. The entire texture, i.e., every level of granularity, may be larger than the size of the memory used to store a portion of it, e.g., one or more granularity levels. A portion of the texture, e.g., one or more granularity levels, may be stored in the memory. Accordingly, a residency check may be used to determine if a portion of the texture, e.g., a granularity level of the texture that may be used for a given rendering of a picture, is resident or non-resident. For example, a GPU may request a residency check to determine, for example, if a particular granularity level of a texture is available in memory and memory controller 8 or an IOMMU may return a residency acknowledge indicating that the result of the residency check, e.g., if a particular granularity level of a texture is available in memory. When a non-resident portion of the texture is needed for the render of a picture the memory controller 8 or IOMMU may return a default value.

In some examples, when a texture needed to render a picture is not available in memory a client may fall back to a more coarse texture with a higher mipmap level (MIP level), where the size in pixels is smaller for a given texture, and, accordingly, the texture is coarser. A mipmap is an ordered set of arrays representing the same image; each array has a resolution lower than the previous one. For example, a mipmap level (MIP level) of 0 may be for the highest resolution image, a MIP level of 1 may be for the second highest resolution image, and so forth, where the highest MIP level is for the image with the coarsest resolution (See Table 1.) A coarser texture is a less detailed version of a texture that may be stored by a processor and it may take less memory to store the less detailed version of the texture. Accordingly, it may be more efficient to store one or more less detailed versions of a texture rather than storing a detailed version of the texture. The coarser version of a partially-resident texture may be more likely to be resident. In some examples, the coarser version of the partially resident texture may be acceptable depending on the level of detail (LOD) needed for the given texture. In some examples, a texture unit may select the level of coarseness displayed. For example, the texture unit may select a coarser texture that is resident rather than a more detailed texture that is non-resident. The texture unit may be separate hardware or may be part of a pixel shader or other shader.

TABLE 1

| Size (in pixels) | MIP Level |
|---|---|
| 512 × 512 | 0 |
| 256 × 256 | 1 |
| 128 × 128 | 2 |
| 64 × 64 | 3 |
| 32 × 32 | 4 |
| 16 × 16 | 5 |
| 8 × 8 | 6 |
| 4 × 4 | 7 |
| 2 × 2 | 8 |
| 1 × 1 | 9 |

The examples described herein generally provide a "fail safe" such that a page fault does not occur for a non-resident page. For example, by falling back to a more coarse texture with a higher mipmap level (MIP level), when a texture needed to render a picture is not available in memory. In some examples, reads may not be needed. This may occur, for example, when reading a more detailed texture level than what is loaded in memory. In that case, the application may be told that the texture is not resident and may use a less detailed version. The texture might not be loaded to save memory. For color writes, the page may be missing to save physical memory.

Some examples may access non-resident pages for color buffering. Color buffering may include read only operations, write only operations, or both read and write operations. A processor (e.g., GPU) may perform a read only operation when, for example, destination alpha channel information is used and the current value of the alpha channel information is to be kept and the write is aborted. This may occurs, for example, in a blending case. The alpha channel is an additional channel that can be added to an image. The alpha channel information contains transparency information about the image, and depending on the type of alpha it can contain various levels of transparency. The alpha channel generally controls the transparency of all the other channels. By adding the alpha channel information to an image the transparency of the red channel, green channel and the blue channel may be controlled. A write only may typically be used to write color values to memory, e.g., one per pixel. A read and write may generally be used for blending. For example, a processor may read a destination color and a destination alpha for a pixel and merge that information for the pixel using, e.g., Porter-Duff style blending, with the incoming source color and source alpha for the pixel. Accordingly, a processor may read and then write data related to blend the data. In some cases there may be aborted writes, in which case only the read occurs. (Porter-Duff blending rule defines a pair of the blending equations for controlling the contributions of two source pixels to a destination pixel.)

FIG. 1 is a block diagram illustrating an example computing device 2 that may be used to implement the techniques described in this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components illustrated in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spreadsheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, patches, etc.

The present disclosure provides for systems and method to inform a client, e.g., CPU 6, GPU 12, or memory controller 8, that a memory page, e.g., a fixed-length contiguous block of virtual memory, is non-resident in memory 10. Some examples may include attempting to access a non-resident page and determining that the non-resident page should not cause a page fault. This determination may be based on a bit indicating that a particular non-resident page should not generate a page fault. Some examples may return a default value when the access of the non-resident page is a read. In some examples, the non-resident page should not cause a page fault and discontinuing a write when the access of the non-resident page is a write. The non-resident page should not cause a page fault. In another example, a processor, e.g., GPU 12 may attempt to access a non-resident page, i.e., a page not stored in a memory such as memory 10. An address for the non-resident page may instead point to a memory page in, for example, memory 10, that contains default values. The default values may be returned to GPU 12 by memory 10 through memory controller 8 when the access of the non-resident page is a read and the non-resident page should not cause a page fault. A write by a processor such as GPU 12 may be discontinued when the write is to anon-resident page and the non-resident page should not cause a page fault. In some examples, the processor, e.g., GPU 12, may recalculate data lost from a discontinued write if the data is later needed.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or more of CPU 6, GPU 12, and memory 10. In some examples, a memory management unit (MMU) may be part of, e.g., GPU 12 or other client. In other examples, the MMU (not shown) may be between every client, e.g., GPU 12, and the memory controller 8.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, cell buffers, vertex buffers, frame buffers, or the like. In addition, memory 10 may store command streams for processing by GPU 12. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc. The memory transfer commands may include, e.g., memory copy commands, memory compositing commands, and block transfer (blitting) commands.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

The techniques for distinguish between non-resident pages that cause a fault and non-resident pages that do not cause a fault described in this disclosure may be implemented in any of the components in computing device 2 illustrated in FIG. 1 including, e.g., CPU 6, GPU 12, and memory 10. A page may also be referred to as a memory page or a virtual page. The page can be a fixed-length contiguous block of virtual memory. Since the page is virtual, it may or may not be stored in a memory, such as memory 10. When a particular page is stored in, e.g., memory 10, it may be referred to as a resident page. Conversely, when a particular page is not stored in, e.g., memory 10, it may be referred to as a non-resident page. It may also be referred to as not resident. In some examples, all or almost all of the techniques for distinguish between non-resident pages that cause a fault and non-resident pages that do not cause a fault may be implemented in GPU 12 (e.g., in a graphics pipeline of GPU 12).

Figure 2:
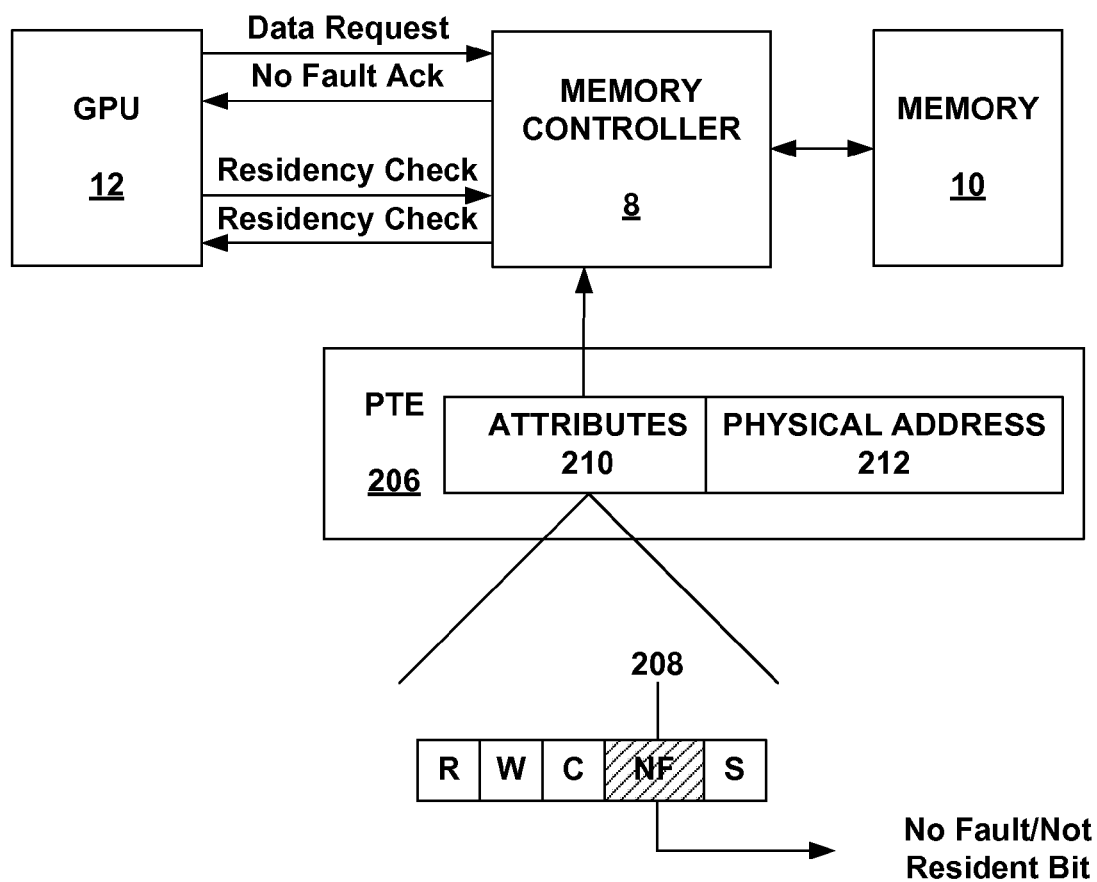
FIG. 2 is a block diagram illustrating an example computing device to implement the techniques for distinguishing between non-resident pages that cause a fault and non-resident pages that do not cause a fault described in this disclosure.
Figure 3:
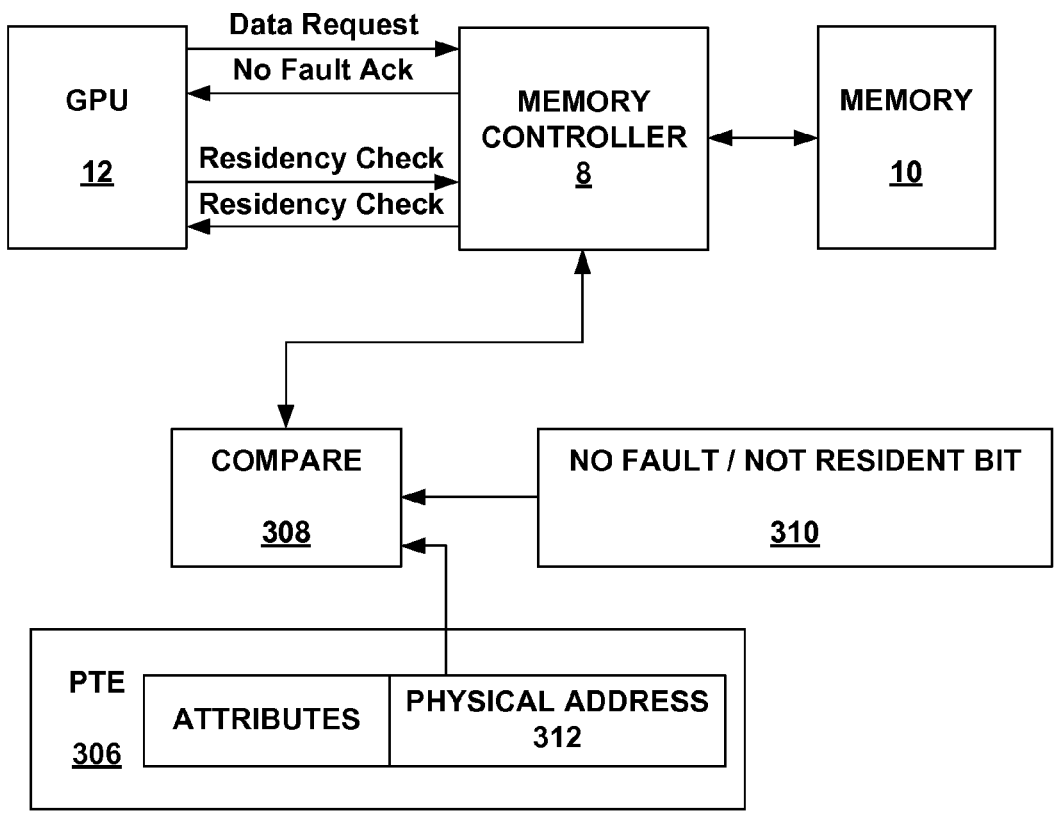
FIG. 3 is a block diagram illustrating another example computing device to implement the techniques for distinguishing between non-resident pages that cause a fault and non-resident pages that do not cause a fault described in this disclosure.

FIGS. 2 and 3 illustrate further details of two example systems of this disclosure that describe various techniques to distinguish between non-resident pages that cause a fault and non-resident pages that do not cause a fault. Additionally, FIGS. 2 and 3 illustrate various ways to let a client, e.g., GPU 12, know when a page is non-resident. In other words, when a page is not stored in a memory such as memory 10. Some examples provide for distinguishing between non-resident pages that cause a fault and do not cause a fault.

FIG. 2 is a block diagram illustrating an example computing device to implement the techniques for distinguishing between non-resident pages that cause a fault and non-resident pages that do not cause a fault described in this disclosure. The computing device includes a GPU 12, memory controller 8, which may be an Input/Output Memory Management Unit (IOMMU), memory 10, which may be Dynamic random-access memory (DRAM), and Page Table (PTE) 206.

As illustrated in FIG. 2, the example computing device includes a memory controller 8. The memory controller 8 may be a form of a memory controller. Additionally, the memory controller 8 may be configured to process various page attributes 210, such as Read Permission (R), Write Permission (W), Cacheable memory location (C), and Shared memory location (S). As illustrated, in the example of FIG. 2, the page attributes 210 may include an additional bit to specify an access to a non-resident page that should not generate a page fault. Thus, the memory controller 8 may be configured to process a "No Fault" (NF) bit 208 indicating that an access to a non-resident page should not generate a page fault. NF bit 208 may indicate that an access to this non-resident page should not generate a page fault.

One purpose of NF bit 208 may be to specify that non-resident material should not cause a fault. NF bit 208 may also affect the determination of a non-resident page. NF bit 208 may be used to determine if the page in a tiled resource is resident as described here. For example, NF bit 208 may be used in conjunction with default values, residency checks, etc. to determine if a page in a tiled resource is resident.

In an example, if GPU 12, memory controller 8, or other processor performs a memory access (e.g., read, write) that causes a fault occurs, then the memory access was to a non-resident page and NF bit 208 must have been set to allow faults for that memory access. If a fault does not occur for the memory access and NF bit 208 is such that a fault is allowed to occur, then the attempted memory access by the GPU 12, memory controller 8, or other processor must be to a resident page. If a fault would have occurred, except NF bit 208 was set so that a fault will not occur, then other aspects of the disclosure may occur, such as returning of default values, residency checks, etc.

FIG. 2 illustrates an example including the "No Fault," "Not Resident Bit," or "Non-resident bit" referred to as "NF" 208. For a given virtual address, the page table may store the physical address 212 that is associated with the virtual address, as well as page attributes 210 of the data stored in the page identified by the physical address. The page attributes 210 may be stored as binary bits prepended to the physical address 212 (as one example). One of these page attributes 210 is NF bit 208, as illustrated in FIG. 2.

Some examples provide for letting a client, e.g., GPU 12, know when a page is non-resident. As described herein, a page is non-resident when it is not stored in a memory, such as memory 10. Since the page is virtual, it may or may not be stored in a memory, such as memory 10. When a particular page is stored in, e.g., memory 10, it may be referred to as a resident page. Conversely, when a particular page is not stored in, e.g., memory 10, it may be referred to as a non-resident page. It may also be referred to as not resident.

A page can be a fixed-length contiguous block of virtual memory. Generally, virtual memory allows a page that does not currently reside in main memory to be addressed and used. In some cases, if a program, e.g., running on GPU 12, tries to access a location in a page that is not in memory, i.e., not resident or non-resident, an exception called a page fault is generated. In some cases an operating system or hardware may load the required page from the auxiliary store automatically. In the instant application, however, some attempted accesses to non-resident pages cause page faults and others do not. As discussed above, DX11 tiled may allow non-resident memory accesses to occur without causing a fault, rather, one or more of the aspects described herein may occur instead.

In the example illustrated in FIG. 2, NF bit 208 may provide an indication that a page that is non-resident should not cause a fault. For example, NF bit 208 may be used to determine if a page in a tiled resource that is non-resident should cause a fault. An advantage to this solution, in some examples, is that page faults may be supported for accesses to all other resources (non-tiled) by simply returning a page fault rather than mapping a virtual address of the non-tiled non-resident page to a dummy page since generally a page fault occurs when a processor or memory management unit attempts to read or write to a memory address of a non-resident page.

In an example, for accessed to tiled resources, NF bit 208 may be set to not allow a fault. Conversely, for accesses to all other resources, e.g., non-tiled, the NF bit 208 may be set to allow a fault. In other words, a read or write to a non-resident page should cause a page fault for accesses to all other resources. Thus, if NF 208 is single bit and NF="1" indicates that not fault should occur, then NF="0" indicates that faults should be processed like normal. Accordingly, for accesses to all other resources, e.g., non-tiled, the NF bit 208 would be "0." The converse is also true. Thus, if NF 208 is a single bit and NF="0," e.g., active low, indicates that not fault should occur, then NF="1" indicates that faults should be processed like normal. Accordingly, for accesses to all other resources, e.g., non-tiled, the NF bit 208 would be "1."

In the example of FIG. 2, when a non-resident page that should not cause a fault is read, default values, e.g., predetermined bit values such as all 0's, all 1's, etc. may be returned for the read. The default value provides a predefine value that may be used for all non-resident page accesses. In the illustrated example, if a read occurs to a non-resident page the value will be 0. The default value may be a value stored, for example, in memory controller 8. Rather than read memory 10, memory controller 8 may return the default value instead. The default value does not conclusively indicate that the page is non-resident, however. The default value, e.g., 0 may be a common value and it may be possible for memory locations in memory 10 of resident pages to contain the default value by chance. Accordingly, memory controller 8 may provide a status or acknowledgement (ACK) to indicate to the device performing the read, e.g., GPU 12, that a non-resident page that should not cause a fault has been accessed.

In an example, a texture unit, which may perform reads but generally does not perform writes, may return the default value when a non-resident page that should not cause a fault is read. The texture unit may be separate hardware or may be part of a pixel shader or other shader. The texture unit may select the level of coarseness displayed. For example, the texture unit may select a coarser texture that is resident rather than a more detailed texture that is non-resident.

As illustrated in the example of FIG. 2, a residency check may be performed (or requested) by the client, e.g., GPU 12. In the example of FIG. 2 a GPU 12 requests a residency check and memory controller 8 returns a residency acknowledge indicating if a virtual memory location is resident or non-resident.

In the example of FIG. 2, when an attempt is made to write to a non-resident page that write attempt should be dropped because the write attempt is to a page that is not stored in memory. In other words, the virtual address of the non-resident page does not map to an actual physical memory address. The data for the attempted write may be lost and may need to be recalculated if the data is later needed. This is generally necessary, however, because no memory location has been allocated to store the information for a non-resident page. In an example, a memory controller 8, e.g., a memory management unit (MMU) or Input/Output MMU (IOMMU), may drop the writes, for example, when the memory controller 8 determines that a write is to a non-resident page. In other examples, a pixel shader, geometry shader, or other shader unit may perform a write and may be programmed to drop writes to non-resident pages.

In some examples, reads and/or writes may be performed for depth testing. Depth testing is a graphics operation that may be used to with respect to image depth coordinates in three-dimensional (3-D) graphics to decide which elements of a rendered scene are visible, and which are hidden. Reads may also be performed as part of color blending, which may use an operation to assign a new color value: New_color=old_color*(1−blend_value)+incoming_color* (blend_value). These functions may use the examples provided herein to allow for dealing with resident and non-resident pages related to depth testing, color blending, etc.

As discussed above, some examples may use existing page table attributes. In other words, there may not need to be a NF bit 208 in such an example. In such an example, a "dummy page" filled will the proper default values can be used for all non-resident pages. The dummy page may be a single memory page filled with the proper default values that may be accessed when any memory addresses to a non-resident page are read, for example.

FIG. 3 is a block diagram illustrating an example computing device to implement the techniques for distinguishing between non-resident pages that cause a fault and non-resident pages that do not cause a fault described in this disclosure. The example of FIG. 3 uses existing page table attributes and does not use a NF bit 208. In such an example, a "dummy page" filled will the proper default values can be used for all non-resident pages. The computing device includes a GPU 12, memory controller 8, memory 10, PTE 306, and compare unit 308. No No Fault/Non-Resident Bit is used.

In the alternative solution illustrated in FIG. 3, a dummy page contains dummy values that indicate if a page is resident. The dummy page may be a single memory page filled with the proper default values that may be accessed when any memory addresses to a non-resident page are read, for example. The dummy values may be, for example, predetermined bit values such as all 0's, all 1's, or some other known values. In other examples, the dummy page may include random or unknown values. In such an example, however, the values in the dummy page will not provide an indication if a page is resident or non-resident. Such an example may store a dummy page at a particular physical memory address in memory 10 and store the value of the physical memory address in a register, e.g., in memory controller 8 or PTE 306. For example, PTE 306 may include physical address register 312. The virtual addresses of the non-resident pages may be mapped to the physical memory address of the dummy page. Additionally, when a page is being accessed, its physical memory in the page table may be compared using compare unit 308 to the physical memory value stored in physical address register 312. If the two values are the same, then the client determines that it is accessing a non-resident page. For example, the client may be GPU 12 and it may determine that is accessing a non-resident page through memory controller 8. If the two values are different, then the client may determine that it is accessing a resident page. It will be understood, however, that this comparison may alone provide an indication that the page is resident, since the values stored in a particular memory location may be equal to the default values simply by chance. Accordingly, other aspects of this disclosure may be used to verify that the indication is correct, for example, a residency check as described herein.

In one example, a system (such as the compare unit 308 illustrated in FIG. 3) may compare an address, e.g., a physical address register 312 in the page table (PTE 306) with an address value for the dummy page stored in a register, for example, a no fault/not resident page address register NF address register 310) to determine if the physical address is the same as the address to the dummy page stored in a register. In this way, the system may determine if the page is resident or non-resident.

Generally, a single common dummy page may be used for all non-resident pages. Accordingly, if the physical address for the page being accessed matches one of the address value in NF address register 310 then the page is non-resident. Reads to the page may proceed as normal. In other words, data stored in the dummy page, e.g., default values may be read from the memory set aside for the dummy page, e.g., in memory 10. This is because the appropriate default value will generally have been written to the dummy page and these values will be read by a system attempting to access a non-resident page. An attempted write should be dropped. Again, the data for the attempted write may be lost and may need to be recalculated if the data is later needed. This is generally necessary, however, because no memory location has been allocated to store the information for a non-resident page other than the page that includes the dummy values that may be used by multiple non-resident pages. Additionally, in an example, a residency check should return false when the page being accessed matches the value in the register that indicate that the page is a non-resident page. For example, a GPU running a shader program may request a residency check from an MMU. When the GPU requests a residency check the MMU may check a residency may to determine if, for example, a tile (multiple memory pages) is resident in memory. If the check of the residency map returns that the tile is non-resident then a default value in the shader might be used rather than fetching the value from the memory.

An advantage to some examples of this solution is that non-resident pages are transparently mapped to the 'dummy page' instead of creating a page fault on reads and that 'special' handling is needed only on writes. Another advantage to some examples of this solution is the default value may be programmable since software may be responsible for filling the page with the default value.

In some examples, the DX11 feature, i.e., tiled resources, may also require a way for a graphics shader program to determine if a tile (multiple memory pages) of a resource is resident. As discussed above, a dummy page filled with the proper default values may be used for all non-resident pages. In some cases, if a write occurs to any of these non-resident pages, however, it will overwrite the default value. Accordingly, the dummy page cannot be relied on to always return the correct default value. A separate residency map is also required to allow the shader program to determine if a page is resident. Such an example may check the residency map to determine if a read from that texture may occur. If the check of the residency map returns that the tile is non-resident then a default value in the shader might be used rather than fetching the value from the tiled texture.

In various examples, techniques for distinguishing between non-resident pages that cause a fault and non-resident pages that do not cause a fault are provided. Additionally, various ways to let a client, e.g., GPU 12, know when a page is non-resident are provided. What a client does when a page that is non-resident is being accessed may vary and may be generally dictated by the needs of the client.

For example, in one case a partially-resident texture may be used. A partially-resident texture that is partially stored in memory. For example, some, but not all of the granularity levels of the texture might be stored in memory. Granularity refers to the level of detail for the texture that may be provided for a particular rendering. Generally, the farther away a given texture is supposed to be in a 2D rendering of a 3D picture the less detail that may be used in a texture.

The texture may be larger than the size of the memory used to store a portion of it. For example, every level of granularity together may be larger than the size of the memory used to store a portion of it, e.g., one or more granularity levels. A portion of the texture, e.g., one or more granularity levels, may, however, be stored in the memory. Accordingly, a residency check may be used to determine if a portion of the texture is resident or non-resident. A non-resident portion of the texture may return a default value.

In some cases, a texture granularity level that is resident may be used rather than a texture granularity level that is non-resident. Accordingly, in such an example a client may fall back to a more coarse texture with a higher mipmap level (MIP level), where the size in pixels is smaller for a given texture and, accordingly, the texture is coarser. A mipmap is an ordered set of arrays representing the same image; each array has a resolution lower than the previous one. For example, a mipmap level (MIP level) of 0 may be for the highest resolution image, a MIP level of 1 may be for the second highest resolution image, and so forth, where the highest MIP level is for the image with the coarsest resolution (see Table 1 above.) By using a coarser texture a less detailed version of a texture may be stored using less memory. Accordingly, a coarser version of a partially-resident texture may itself be a resident portion of the texture. In some examples, the coarser version of the partially-resident texture may be acceptable depending on the level of detail (LOD) needed for the given texture. In some examples, a texture unit may select the level of coarseness displayed from a plurality of different coarseness levels for a given texture. The texture unit may be separate hardware or may be part of a pixel shader or other shader. The examples described herein generally provide a "fail safe" such that a page fault does not occur for a non-resident page.

Figure 4:
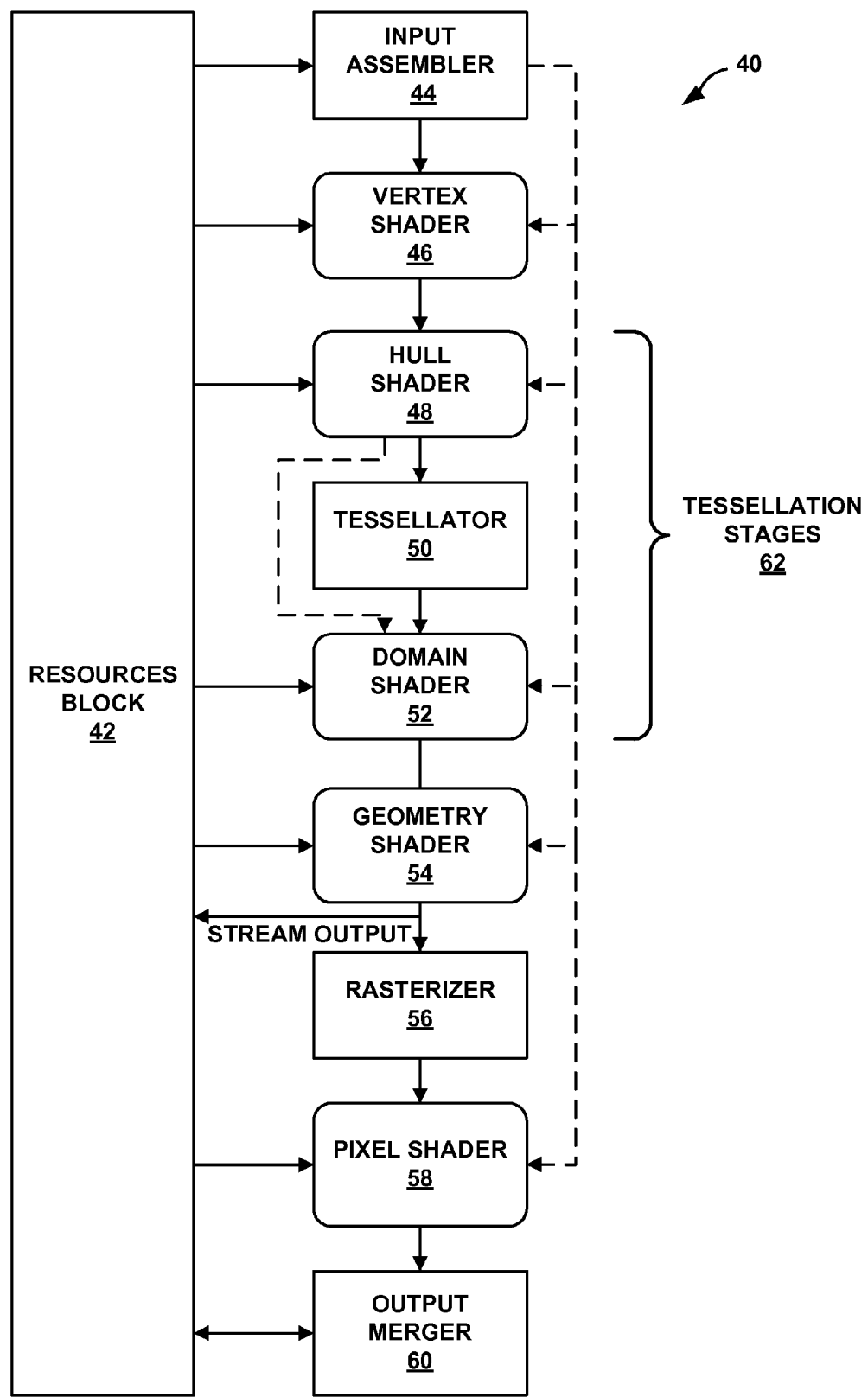
FIG. 4 is a conceptual diagram illustrating an example graphics pipeline that includes units that may perform the techniques for distinguishing between non-resident pages that cause a fault and non-resident pages that do not cause a fault of this disclosure.

FIG. 4 is a conceptual diagram illustrating an example graphics pipeline that may perform the techniques for distinguishing between non-resident pages that cause a fault and non-resident pages that do not cause a fault of this disclosure. In some examples, the graphics pipeline may correspond to the Microsoft® DirectX (DX) 11 graphics pipeline. As illustrated in FIG. 4, the example graphics pipeline includes a resources block 42 and a plurality of processing stages. The plurality of processing stages include an input assembler (IA) stage 44, a vertex shader (VS) stage 46, a hull shader (HS) stage 48, a tessellator stage 50, a domain shader (DS) stage 52, a geometry shader (GS) stage 54, a rasterizer stage 56, a pixel shader (PS) stage 58, and an output merger stage 60. HS stage 48, tessellator stage 50, and domain shader stage 52 may form the tessellation stages 62 of the graphics pipeline.

As described herein, in some examples provide a way for a graphics shader program, e.g., VS stage 46, HS stage 48, DS stage 52, GS stage 54, PS stage 58, or other stages to determine if a tile (multiple memory pages) of a resource is resident. A tile of a resource is resident when it is stored in a memory such as memory 10. A tile of a resource is non-resident when it is not stored in a memory.

In some examples, a dummy page filled with the proper default values may be used for all non-resident pages. A dummy page is a memory page that may be used to provide an area of memory, e.g., memory 10, that may be read when a read to any non-resident pages is attempted. Default values that may be stored in the dummy page may be any predetermined values, such as all 0's, all 1's, or any other predetermined values. Use of a known predetermined value as a default value may allow for a read to provide an indication that a page may be a non-resident page. In some examples, random values, left over values from previous writes, or any other values might be used instead. In such an example, the indication might not be provided because a predetermined value is not used.

In some cases, if a write occurs to any of the non-resident pages, it will overwrite the default value. Accordingly, the dummy page cannot be relied on to always return the correct default value, for example, if a write is allowed to be competed. A separate residency map may also be used to allow shader programs, for example, shader stages 46, 48, 52, 54, 58, to run on, for example, GPU 12, to determine if a page is resident. Generally, any shader program may interact as described herein to determine if a page is resident. Typically, all the shader programs have memory access. The residency map may be part of memory controller 8 or may be stored in memory 10, e.g., by memory controller 8. In such an example, GPU 12 or e.g., a shader program running on GPU 12 may check the residency map to determine if a read from a particular page is resident or non-resident. In some examples all or a portion of a texture may be stored in memory 10. If only a portion of the texture is stored in, e.g., memory 10, then some of the texture is resident and some of the texture program is non-resident. For example, different coarseness levels of the texture may be stored in memory 10 while other coarseness levels of the texture may not be stored in memory 10. Accordingly, the residency map may be used to perform a residency check to determine if a particular coarseness level of a particular texture that may be needed for a rendering of a particular picture may occur. If the check of the residency map returns that the tile containing the needed coarseness level of a texture is non-resident then a default value in the shader stages 46, 48, 52, 54, 58 might be used rather than fetching the value from the tiled texture. Some examples may read a different coarseness level of the partially-resident texture when the read is to a non-resident page.

As illustrated in FIG. 4, many of the pipeline stages may also be communicatively coupled to resources block. The resources block may include memory resources such as buffers and textures. The remaining blocks indicate pipeline stages. The blocks with straight corners represent fixed-function pipeline stages, and the blocks with rounded corners represent programmable stages. Each of the programmable stages may be configured to execute a shader program of a particular type. For example, vertex shader stage 46 may be configured to execute a vertex shader program, hull shader stage 48 may be configured to execute a hull shader program, etc. Each of the different types of shader programs may execute either on a common shader unit of the GPU or on one or more dedicated shader units that are dedicated to executing shader programs of one or more particular types. Hull shader stage 48, tessellator stage 50, and domain shader stage 52 stage may be collectively referred to as tessellation stages 62.

Additional background information regarding the general operation of the DirectX 11 graphics pipeline may be found at http://msdn.microsoft.com/en-us/library/windows/desktop/ff476882%28v=vs.85%29.aspx, as of May 9, 2013, and is hereby incorporated by reference. Further information regarding the general operation of the DirectX 11 graphics pipeline may be found in Zink et al., "Practical Rendering & Computation with Direct3D 11," CRC Press (2011), the entire contents of which is incorporated herein by reference.

Figure 5:
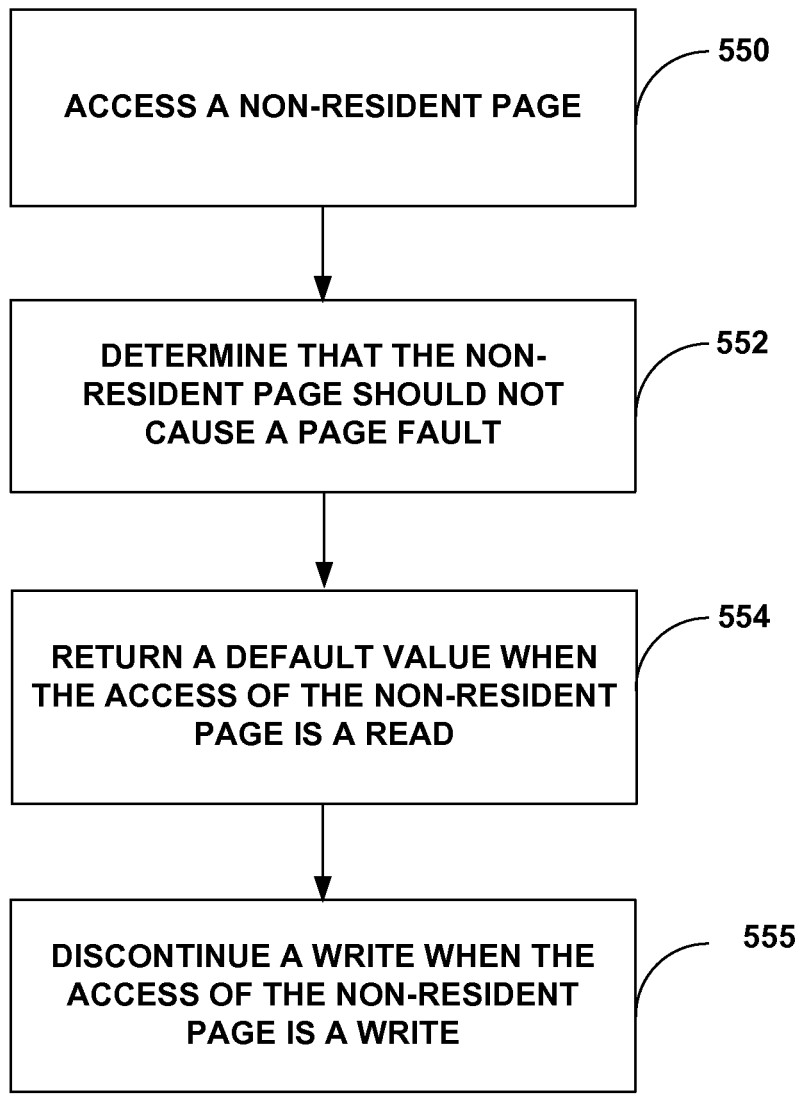
FIG. 5 is a flowchart illustrating an example method in accordance with one or more examples described in this disclosure.

FIG. 5 is a flowchart illustrating an example method in accordance with one or more examples described in this disclosure. In some examples, memory controller 8, GPU 12, or other processor may attempt to access a non-resident page. An address for the non-resident page may point to a memory page containing default values. In some examples the access may be to perform, for example, a read (550). A non-resident page is a page that does not have a physical memory location associated with it. Conversely, a resident page is a page that has a physical memory location associated with it.

Memory controller 8, GPU 12, or other processor may determine that the non-resident page should not cause a page fault based on a bit or flag indicating that a particular non-resident page should not generate a page fault (552). A new feature in DX11 called tiled resources allows for non-resident pages of a resource to be accessed via a graphics operation (i.e. texture read, color buffer write) without faulting. Accordingly, it may be necessary to distinguish between non-resident pages that cause a fault and non-resident pages that do not cause a fault. The bit allows a client to know when a page is non-resident.

Memory controller 8, GPU 12, or other processor may receive a return of an indication that a memory read did not translate and also return the default values when the access of the non-resident page is a read and the non-resident page should not cause a page fault (554). The default values may be from registers, memory, or other locations. Default values may be predetermined bit values such as all 0's, all 1's, or some other default value. These default value may be returned by the read. The default value provides a predefine value that may be used for all non-resident page accesses. In the illustrated example, if a read occurs to a non-resident page the value will be 0. This does not conclusively indicate that the page is non-resident, however. The default value, e.g., 0, 1, etc. may be a common value and it may be possible for resident pages to contain the default value by chance. An MMU or other processor may use a status or acknowledgement (ACK), for example, to indicate to the device performing the read that a non-resident page that should not cause a fault has been accessed. In an example, a texture unit, which may perform reads but generally does not perform writes, may return the default value when it or another processor reads a non-resident page that should not cause a fault. Additionally, in an example, the client may perform a residency check.

In some examples, memory controller 8, GPU 12, or other processor may discontinue a write when the access of the non-resident page is a write and the non-resident page should not cause a page fault (556). In some examples, the write may be discontinues since no memory is provided for the non-resident page.

Figure 6:
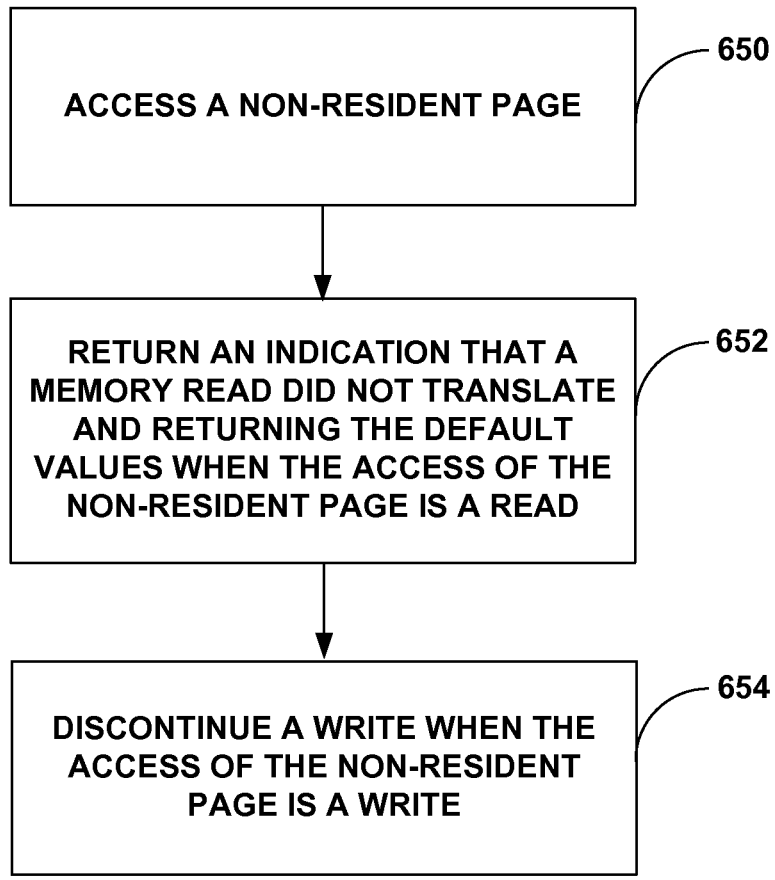
FIG. 6 is a flowchart illustrating an example method in accordance with one or more examples described in this disclosure.

FIG. 6 is a flowchart illustrating an example method in accordance with one or more examples described in this disclosure. Memory controller 8, GPU 12, or other processor may access a non-resident page (650). An address for the non-resident page may point to a memory page containing default values. The memory page containing default value may also be referred to as a dummy page and be said to contain dummy values. These dummy values may indicate if a page is resident. For example, when accessing the dummy page the byte address of the read request may be mapped into the dummy page and the value stored there will be returned e.g., instead of 0x0, unless that is the dummy value.

Memory controller 8, GPU 12, or other processor may receive returned an indication that a memory read did not translate and returning and the default values when the memory controller 8, GPU 12, or other processor may attempt to access non-resident page (652). This may occur, for example, when memory controller 8, GPU 12, or other processor attempts a read from the non-resident page. The non-resident page should not cause a page fault. Reads to the page may proceed as normal. This is because the appropriate default value will already have been written to the dummy page and these values will be read by a system attempting to access a non-resident page. A memory read does not translate when the virtual address does not map to a physical address.

Memory controller 8, GPU 12, or other processor may or in some cases, a memory itself may discontinue a write when the access of the non-resident page is a write and the non-resident page should not cause a page fault (654). In some cases, if a write occurs to any of these non-resident pages, however, it will overwrite the default value. Accordingly, if the write were allowed to continue, the dummy page would not be able to be relied on to always return the correct default value.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of processing a non-resident page comprising:
    determining, with a memory management unit (MMU), that a processor attempted to access a first non-resident page, the first non-resident page comprising a page that does not map to a page in memory;
    reading a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;
    in response to the determination that the processor attempted to access the first non-resident page, determining, with the MMU, whether the page fault is to occur from the access to the first non-resident page or whether the page fault is not to occur from the access to the first non-resident page based on the first set of one or more values;
    in response to the first non-resident page being for texture information and the determination that the page fault is not to occur from the access to the first non-resident page, returning, to the processor with the MMU:
        an indication that a memory read did not translate, and
        an address for default values when the access of the first non-resident page is a read;
    determining, with the MMU, that the processor attempted to access a second non-resident page, the second non-resident page comprising a page that does not map to a page in the memory;
    reading a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information;
    in response to the determination that the processor attempted to access the second non-resident page, determining, with the MMU, whether the page fault is to occur from the access to the second non-resident page or whether the page fault is not to occur from the access to the second non-resident page based on the second set of one or more values; and
    in response to the second non-resident page not being for texture information and the determination that the page fault is to occur from the access to the second non-resident page, receiving, with the processor, information indicative of the page fault of the second non-resident page.

2. The method of claim 1, wherein reading the first set of one or more values comprises reading a bit or a flag, and wherein determining whether the page fault is to occur or is not to occur comprises determining whether the page fault is to occur or is not to occur based on the bit or flag.

3. The method of claim 1, further comprising performing a residency check when the default values are returned.

4. The method of claim 1, wherein the access comprises a read to a partially-resident texture.

5. The method of claim 4, further comprising reading a coarseness level of the partially-resident texture as part of the access to the first non-resident page.

6. The method of claim 1, wherein determining that the processor attempted to access comprises determining that the processor attempted to access the first non-resident page for color buffering.

7. A method of processing a non-resident page comprising:
    determining, with a memory management unit (MMU), that a processor attempted to access a first non-resident page, the first non-resident page comprising a page that does not map to a page in memory;
    reading a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;

in response to the determination that the processor attempted to access the first non-resident page, determining, with the MMU, whether the page fault is to occur from the access to the first non-resident page or whether the page fault is not to occur from the access to the first non-resident page based on the first set of one or more values;

in response to the first non-resident page being for texture information and the determination that the page fault is not to occur from the access to the first non-resident page, discontinuing a write access of the first non-resident page by the processor;

determining, with MMU, that the processor attempted to access a second non-resident page, the second non-resident page comprising a page that does not map to a page in the memory;

reading a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information;

in response to the determination that the processor attempted to access the second non-resident page, determining, with the MMU, whether the page fault is to occur from the access to the second non-resident page or whether the page fault is not to occur from the access to the second non-resident page based on the second set of one or more values; and in response to the second non-resident page not being for texture information and the determination that the page fault is to occur from the access to the second non-resident page, receiving, with the processor, information indicative of the page fault of the second non-resident page.

8. The method of claim 7, wherein an address for the first non-resident page points to a memory page containing default values, the method further comprising comparing an address in a page table with an address value for the memory page containing default values, wherein determining that the processor attempted to access the first non-resident page comprises determining that the processor attempted to access the first non-resident page based on the comparison.

9. The method of claim 8, wherein the address value for the memory page containing default values is stored in a register.

10. The method of claim 7, wherein an address for the first non-resident page points to a memory page containing default values, wherein reading the one or more values comprises reading the default values, and wherein the default values indicate that a page is resident or non-resident.

11. The method of claim 7, further comprising recalculating data lost from a discontinued write if the data is later needed.

12. An apparatus for processing a non-resident page comprising:

a memory comprising a plurality of pages;

a processor comprising integrated circuitry, the processor configured to:
attempt to access a first non-resident page, the first non-resident page comprising a page that does not map to a page in the memory; and
attempt to access a second non-resident page, the second non-resident page comprising a page that does not map to a page in the memory;

a memory management unit (MMU) comprising integrated circuitry, the MMU configured to:
determine that the processor attempted to access the first non-resident page;
read a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;
in response to the determination that the processor attempted to access the first non-resident page, determine whether the page fault is to occur from the access to the first non-resident page or whether the page fault is not to occur from the access to the first non-resident page based on the first set of one or more values;
in response to the first non-resident page being for texture information and the determination that the page fault is not to occur from the access to the first non-resident page, return to the processor:
an indication that a memory read did not translate, and
an address for the default values when the access of the first non-resident page is a read;
determine that the processor attempted to access the second non-resident page;
read a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information; and
in response to the determination that the processor attempted to access the second non-resident page, determine whether the page fault is to occur from the access to the second non-resident page or whether the page fault is not to occur from the access to the second non-resident page based on the second set of one or more values, wherein the processor is configured to receive information indicative of the page fault of the second non-resident page in response to the second non-resident page not being for texture information and the determination that the page fault is to occur from the access to the second non-resident page.

13. The apparatus of claim 12, wherein, to read the first set of one or more values, the MMU is configured to read a bit or a flag, and wherein the MMU is configured to determine whether the page fault is to occur or is not to occur based on the bit or flag.

14. The apparatus of claim 12, wherein the processor is further configured to perform a residency check when the default values are returned.

15. The apparatus of claim 12, wherein, to attempt to access the first non-resident page, the processor is further configured to perform a read to a partially-resident texture.

16. The apparatus of claim 15, wherein the processor is further configured to read a coarseness level of the partially-resident texture as part of the access to the non-resident page.

17. The apparatus of claim 12, wherein, to determine that the processor attempted to access the first non-resident page, the processor is configured to determine that the processor attempted to access the first non-resident page for color buffering.

18. An apparatus for processing a non-resident page comprising:
    a memory comprising a plurality of pages;
    a processor comprising integrated circuitry, the processor configured to:
        attempt to access the non-resident page, the non-resident page comprising a page that does not map to a page in the memory; and
        attempt to access a second non-resident page, the second non-resident page comprising a page that does not map to a page in the memory;
    a memory management unit (MMU) comprising integrated circuitry, the MMU configured to:
        determine that the processor attempted to access the first non-resident page;
        read a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;
        in response to the determination that the processor attempted to access the first non-resident page, determine whether the page fault is to occur from the access to the non-resident page or whether the page fault is not to occur from the access to the non-resident page based on the first set of one or more values;
    wherein, in response to the first non-resident page being for texture information and the determination that the page fault is not to occur from the access to the first non-resident page, the processor is configured to discontinue a write when the access of the first non-resident page is a write,
        determine that the processor attempted to access the second non-resident page;
        read a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information; and
        in response to the determination that the processor attempted to access the second non-resident page, determine whether the page fault is to occur from the access to the second non-resident page or whether the page fault is not to occur from the access to the second non-resident page based on the second set of one or more values,
    wherein, in response to the second non-resident page not being for texture information and the determination that the page fault is to occur from the access to the second non-resident page, the processor is configured to receive information indicative of the page fault of the second non-resident page.

19. The apparatus of claim 18, wherein an address for the first non-resident page points to a memory page containing default values, wherein the MMU is further configured to compare an address in a page table with an address value for the memory page containing default values, and wherein to determine that the processor attempted to access the first non-resident page, the MMU is configured to determine that the processor attempted to access the first non-resident page based on the comparison.

20. The apparatus of claim 19, wherein the address value for the memory page containing default values is stored in a register.

21. The apparatus of claim 18, wherein an address for the first non-resident page points to a memory page containing default values, wherein to read the one or more values, the MMU is configured to read the default values, and wherein the default values indicate that a page is resident or non-resident.

22. The apparatus of claim 18, wherein the processor is further configured to recalculate data lost from a discontinued write if the data is later needed.

23. An apparatus for processing a non-resident page comprising:
    a processor; and
    a memory management unit (MMU),
    wherein the MMU comprises:
        means for determining that the processor attempted to access a first non-resident page, the first non-resident page comprising a page that does not map to a page in memory;
        means for reading a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;
        means for determining whether the page fault is to occur from the access to the first non-resident page or whether the page fault is not to occur from the access to the first non-resident page based on the first set of one or more values, in response to the determination that the processor attempted to access the first non-resident page based on the first set of one or more values;

means for returning, in response to the first non-resident page being for texture information and the determination that the page fault is not to occur from the access to the first non-resident page, to the processor:
an indication that a memory read did not translate, and
an address for default values to the processor when the access of the first non-resident page is a read;

means for determine that the processor attempted to access a second non-resident page;

means for reading a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information; and means for determining whether the page fault is to occur from the access to the second non-resident page or whether the page fault is not to occur from the access to the second non-resident page based on the second set of one or more values, in response to the determination that the processor attempted to access the second non-resident page, wherein the processor comprises means for receiving information indicative of the page fault of the second non-resident page in response to the second non-resident page not being for texture information and the determination that the page fault is to occur from the access to the second non-resident page.

24. The apparatus of claim 23, wherein means for reading the first set of one or more values comprises means for reading a bit or a flag, and wherein the means for determining whether the page fault is to occur or is not to occur comprises means for determining whether the page fault is to occur or is not to occur based on the bit or flag.

25. The apparatus of claim 23, further comprising means for performing a residency check when a default value is returned.

26. An apparatus for processing a non-resident page comprising:
a processor; and
a memory management unit (MMU),
wherein the MMU comprises:
means for determining that the processor attempted to access a first non-resident page, the first non-resident page comprising a page that does not map to a page in memory;
means for reading a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information; and means for determining whether the page fault is to occur from the access to the first non-resident page or whether the page fault is not to occur from the access to the first non-resident page based on the first set of one or more values, in response to the determination that the processor attempted to access the first non-resident page;

means for determining that the processor attempted to access a second non-resident page, the second non-resident page comprising a page that does not map to a page in the memory;

means for reading a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information; and means for determining whether the page fault is to occur from the access to the second non-resident page or whether the page fault is not to occur from the access to the second non-resident page based on the second set of one or more values, in response to the determination that the processor attempted to access the second non-resident page;

wherein the processor comprises:
means for discontinuing a write access of the first non-resident page in response to the first non-resident page being for texture information and the determination that the page fault is not to occur from the access to the first non-resident page; and
means for receiving information indicative of the page fault of the second non-resident page in response to the second non-resident page not being for texture information and the determination that the page fault is to occur from the access to the second non-resident page.

27. The apparatus of claim 26, wherein an address for the first non-resident page points to a memory page containing default values, the apparatus further comprising means for comparing an address in a page table with an address value for the memory page containing default values, wherein the means for determining that the processor attempted to access the non-resident page comprises means for determining that the processor attempted to access the non-resident page based on the comparison.

28. The apparatus of claim 27, further comprising means for storing the address value for the memory page containing default values.

29. The apparatus of claim 26, further comprising means for recalculating data lost from a discontinued write if the data is later needed.

30. A non-transitory computer readable storage medium storing instructions that upon execution:
cause a memory management unit (MMU) to determine that a processor attempted to access a first non-resident page, the first non-resident page comprising a page that does not map to a page in memory;

read a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;

in response to the determination that the processor attempted to access the first non-resident page, cause the MMU to determine whether the page fault is to occur from the access to the first non-resident page or whether the page fault is not to occur from the access to the first non-resident page based on the first set of one or more values;

in response to the first non-resident page being for texture information and the determination that the page fault is not to occur from the access to the first non-resident page, cause the MMU to return, to the processor:
an indication that a memory read did not translate, and an address for default values when the access of the first non-resident page is a read;

cause the MMU to determine that the processor attempted to access a second non-resident page, the second non-resident page comprising a page that does not map to a page in the memory;

read a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information;

in response to the determination that the processor attempted to access the second non-resident page, cause the MMU to determine whether the page fault is to occur from the access to the second non-resident page or whether the page fault is not to occur from the access to the second non-resident page based on the second set of one or more values; and in response to the second non-resident page not being for texture information and the determination that the page fault is to occur from the access to the second non-resident page, cause the processor to receive information indicative of the page fault of the second non-resident page.

31. A non-transitory computer readable storage medium storing instructions that upon execution:

cause a memory management unit (MMU) to determine that a processor attempted to access a first non-resident page, the first non-resident page comprising a page that does not map to a page in memory;

read a first set of one or more values indicative of whether a page fault is to occur from the access to the first non-resident page or whether the page fault is not to occur from the access to the first non-resident page based on whether the first non-resident page is for texture information or not for texture information, wherein the first set of one or more values indicates that the page fault is not to occur based on the first non-resident page being for texture information and indicates that the page fault is to occur based on the first non-resident page not being for texture information;

in response to the determination that the processor attempted to access the first non-resident page, cause the MMU to determine whether a page fault is to occur from the access to the first non-resident page or whether the page fault is not to occur from the access to the first non-resident page based on the first set of one or more values;

in response to the first non-resident page being for texture information and the determination that the page fault is not to occur from the access to the first non-resident page, cause the processor to discontinue a write access of the non-resident page;

cause the MMU to determine that the processor attempted to access a second non-resident page, the second non-resident page comprising a page that does not map to a page in the memory;

read a second set of one or more values indicative of whether a page fault is to occur from the access to the second non-resident page or whether the page fault is not to occur from the access to the second non-resident page based on whether the second non-resident page is for texture information or not for texture information, wherein the second set of one or more values indicates that the page fault is not to occur based on the second non-resident page being for texture information and indicates that the page fault is to occur based on the second non-resident page not being for texture information;

in response to the determination that the processor attempted to access the second non-resident page, cause the MMU to determine whether a page fault is to occur from the access to the second non-resident page or whether the page fault is not to occur from the access to the second non-resident page based on the second set of one or more values; and in response to the second non-resident page not being for texture information and the determination that the page fault is to occur from the access to the second non-resident page, cause the processor to receive information indicative of the page fault of the second non-resident page.

\* \* \* \* \*